Patented June 2, 1936

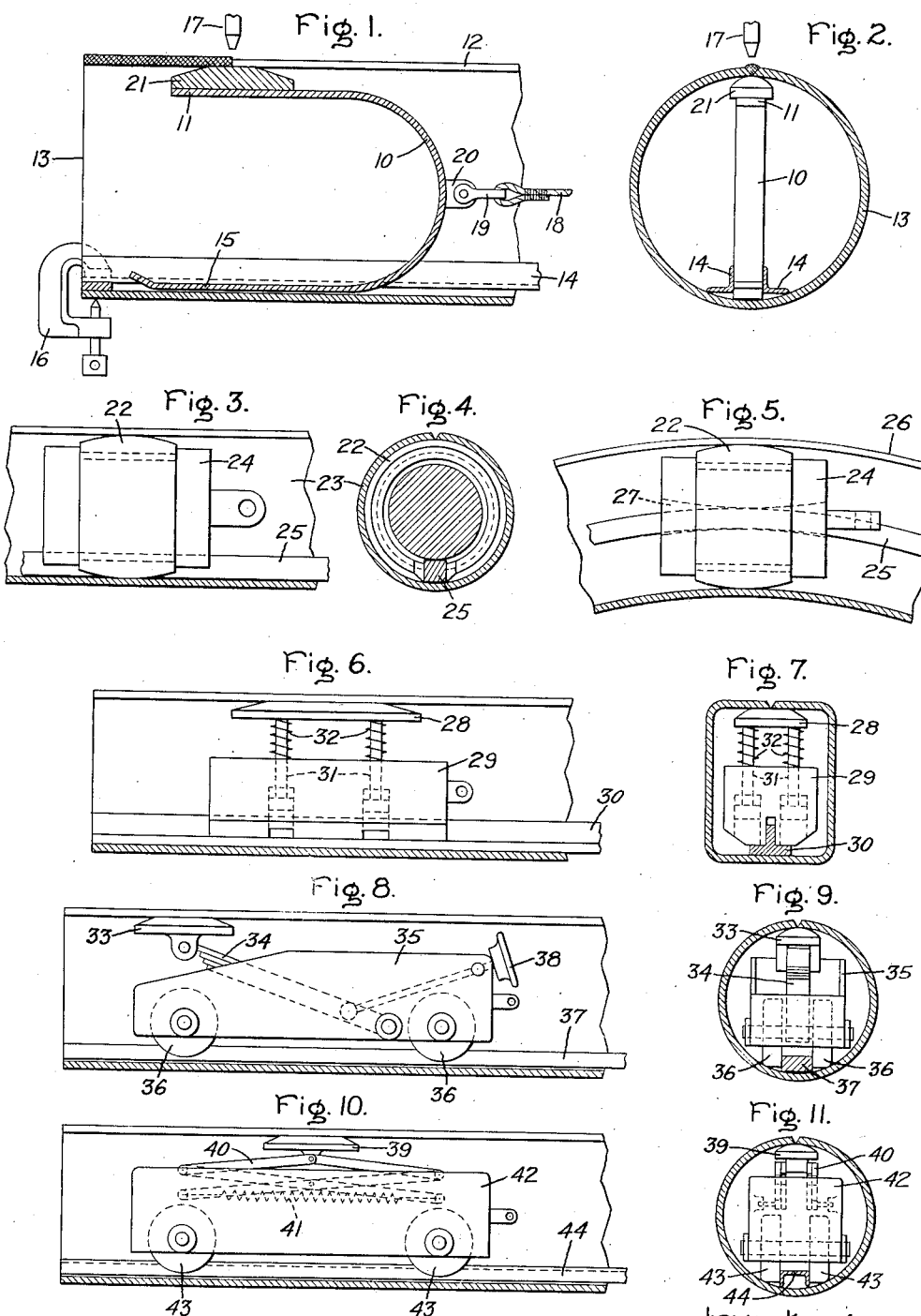

2,043,020

UNITED STATES PATENT OFFICE 2,043,020

PIPE WELDING APPARATUS

Erwin Thiemer, Hennigsdorf, Germany, assignor to General Electric Company, a corporation of New York Application December 12, 1933, Serial No. 702,065
In Germany December 21, 1932

6 Claims. (Cl. 113—59)

My invention relates to pipe welding and more particularly to apparatus primarily intended for welding the longitudinal seams of pipes.

It is an object of my invention to provide an improved backing member which is adapted to engage the inside surface of a pipe progressively along a seam at the point of welding.

It is a further object of my invention to provide means such as described above which is simple in construction and of such a nature that it may be used in places where the space at each end of the pipe being welded is limited due to the restrictions imposed by the building, in which the welding operation is performed or by the presence of other objects located at the ends of the pipe.

It is another object of my invention to provide a backing member which will accurately follow irregularities in the pipe at the point of welding and which is positively guided along the seam during welding.

Further objects of my invention will become apparent from a consideration of the several embodiments illustrated in the drawing.

The figures of the drawing show the illustrated embodiments in operative relation to the pipes in which they are employed as a backing member during an arc welding operation. Figs. 1 and 2 show side and end views partly in section of one embodiment of my invention; Figs. 3 and 4 show side and end views partly in section of another embodiment of my invention; Fig. 5 illustrates a side view partly in section of a modification of the construction illustrated in Figs. 3 and 4; Figs. 6 and 7 show side and end views partly in section of a third modification of my invention; Figs. 8 and 9 show side and end views partly in section of a fourth modification of my invention and Figs. 10 and 11 show side and end views partly in section of a fifth modification of my invention.

The modification illustrated in Figs. 1 and 2 comprises a spring bow 10 one end of which, 11, is adapted to function as a backing member. The end 11 of the bow is directed along the seam to be welded 12 in the pipe 13 by guiding means comprising angle irons 14 which engage the opposite edges of the bow along its other end 15. The angles 14 are attached to the inside surface of the pipe 13 by clamps 16. The bow is moved through the pipe in synchronism with welding means 17 by means indicated in the drawing as a flexible cable 18 which is attached to the bow through the agency of a clevice 19 and a lug 20 forming a part of the bow. It is to be understood that any suitable mechanism may be provided for traversing the bow through the pipe in synchronism with the welding means so that the portion of the bow which functions as a backing member on the inside of the pipe at the point of welding will move in synchronism with the welding means used for performing the welding operation. It will also be understood that the end 11 of the bow may be provided with a shoe 21 which, when worn or destroyed by the heat of the welding means, may be replaced by a new shoe. The shoe is preferably made of copper or similar material although it is to be understood that insulating materials such as carborundum or quartz may be employed.

The operation of the embodiment illustrated in Figs. 1 and 2 is as follows: As the seam 12 of the pipe 13 is welded by the welding means 17, the spring bow 10 is traversed through the pipe in synchronism with the welding means and the shoe 21 is pressed into engagement with the inside surface of the pipe at the point of welding. The shoe 21 is definitely directed along the seam by reason of the guiding influence exerted on the bow 10 by the angles 14. It is thus impossible for the bow to twist in the pipe and move the shoe to an inoperative position to one side or the other of the seam. Due to the fact that the bow is a spring bow, the shoe will follow irregularities in the pipe at the seam and at all times make a firm contact with the inside surface of the pipe at the seam.

Because the length of the bow may be made small relative to the length of the pipe in which it is to be used, it may be introduced and removed from the pipe at its ends without difficulty even though the end space available is quite limited. The guiding means in the pipe need not be removed from the pipe until it has been transported to a location in which the end room available is much greater than the end room necessary for inserting and removing the backing means. It is to be understood that the guiding means are only temporarily attached to the inside surface of the pipe and are to be removed from the pipe at the completion of the welding operation. Instead of using clamps to attach the guiding members to the inside surface of the pipe, these members may be attached thereto by spot welding them to the pipe and thereafter removed from the pipe by breaking the spot welds.

The embodiments illustrated in Figs. 3, 4, and 5 are particularly adapted for welding pipes of small diameter. The backing member in these embodiments comprises a spring ring 22 which unrestrained will expand to a diameter larger than the inside diameter of the pipe 23 with which it is to be used. The ring 22 is mounted on a support 24 which is guided through the pipe 23 by a bar 25 which is attached to the inside surface of the pipe. This bar functions as a guiding means which prevents turning of the ring in the pipe and positions the open portion in the periphery of the ring away from the seam in the pipe being welded. It is thus impossible for the open portion of the ring to assume a position immediately under the seam being welded and consequently the seam is at all times positively supported on the inside of the pipe at the point of welding.

The pipe engaging surface of the spring ring is preferably made convex longitudinally as illustrated in the figures. This construction is particularly desirable when the backing up member is used in curved pipes, such as illustrated at 26 in Fig. 5. When the backing member is used with curved pipes the channel 27 in the carrier 24 is flared at its ends in order to permit the spring ring to make a normal engagement at the point of welding with the pipe through which it is directed by its guiding bar.

The embodiments illustrated in Figs. 3, 4, and 5 are used in the same manner as the embodiment above described, that is, they are traversed through the pipe in synchronism with the welding means during the welding operation.

In Figs. 6 and 7 an embodiment is illustrated in which the backing member 28 is supported on a carriage 29 which rides on and is directed through the pipe by means of a guide bar 30 attached to the inside surface of the pipe. The backing member is supported on the carriage by bolts 31 and is spring pressed into engagement with the inside of the pipe at the seam by means of springs 32. The embodiment illustrated in Figs. 6 and 7 functions as described above.

In the embodiment illustrated in Figs. 8 and 9, the backing member 33 is attached to the end of a leaf spring 34, the other end of which is supported on a carriage 35. This carriage is adapted to traverse the inside of the pipe being welded and is provided with wheels 36 which straddle and engage a guiding bar 37 attached to the inside surface of the pipe. The backing up pressure of the shoe may be controlled by means of a hand wheel 38 by means of which the spring 34 is biased toward the seam to be welded. This embodiment is used as described above in connection with the preceding figures.

In the embodiment illustrated in Figs. 10 and 11 the backing member 39 is supported on a pantograph 40 which is biased in the proper direction to force the backing member 39 into engagement with the inside surface of the pipe by means of a spring 41. The pantograph is supported on a carriage 42 mounted on wheels 43 which straddle and engage a guiding bar or track 44 attached to the inside surface of the pipe. This embodiment is used in the same manner described above in connection with the previously described embodiments.

Although any particular embodiment of my invention is primarily adapted for use with pipes of a given diameter, it may be adapted to pipes of larger diameter by properly positioning the guiding means on supports having a height great enough to bring the backing member into operative relation with the inside of the pipe at the seam to be welded. By providing supports of various heights, a single backing member may be used with pipes of a plurality of sizes. The size of any embodiment will however definitely determine the minimum size of pipe with which it can be used. For welding small pipes the embodiments illustrated in Figs. 3, 4, and 5 are, as pointed out above, to be preferred to the embodiments illustrated in the other figures. The embodiments illustrated in Figs. 8 to 11 inclusive may be used for welding pipes of different diameters without providing an elevated track for the carriage by means of which the backing members are supported, since the backing members may be elevated or are spring biased to an elevated position which adapts them for welding pipes the diameters of which may vary a considerable amount.

Since embodiments other than those illustrated and described above may be made without departing from the spirit and scope of my invention, I intend to cover by the appended claims all such modifications and variations as fall within the true spirit and scope of my invention.

What I claim as new and desire to secure by Letters Patent of the United States, is,—

1. Pipe welding apparatus comprising a backing member adapted to engage the inside surface of a pipe progressively along a longitudinal seam at the point of welding, means for guiding said backing member through said pipe and along said seam, means for attaching said guiding means to the inside surface of said pipe, spring means for forcing said backing member into engagement with the inside surface of said pipe, and means for moving said backing member through said pipe during welding.

2. Pipe welding apparatus comprising a spring bow one end of which is adapted to function as a backing member, means engaging said bow for guiding the end functioning as a backing member along the inside surface of a pipe at the point of welding, means for attaching said guiding means to the inside surface of said pipe, and means for moving said bow through said pipe during welding.

3. Apparatus for welding longitudinal seams in pipes comprising a spring ring backing member having an opening in its periphery, which member unrestrained will expand to a diameter larger than the inside diameter of the pipe in which it is used during welding, and means for moving said ring backing member through said pipe with its open portion positioned away from the seam in the pipe being welded.

4. Pipe welding apparatus comprising a spring ring backing member which unrestrained will expand to a diameter larger than the inside diameter of a pipe to be welded, a support for said ring, means for guiding said support and said ring along said pipe, means for attaching said guiding means to the inside surface of said pipe, and means connected to said support for moving said support and ring through said pipe during welding.

5. Apparatus for welding longitudinal seams in curved pipes comprising a guide bar of substantially the same curvature as the pipe to be welded, means for attaching said bar to the inside surface of said pipe, a spring ring having a longitudinally convex pipe engaging surface, a support therefor having a channel therein for said guide bar, the ends of said channel being flared to permit said spring ring supported on said carrier to make a normal engagement at the point of welding with the pipe through which it is directed by said guide bar, and means connected to said support for moving said support and said spring ring through said pipe during welding.

6. Pipe welding apparatus comprising a backing member adapted to engage the inside surface of a pipe progressively along a longitudinal seam at the point of welding, means for forcing said member into engagement with the inside surface of said pipe, a carriage for supporting said means, means for guiding said carriage through said pipe and along said seam, means for attaching said guiding means to the inside surface of said pipe, and means for moving said carriage through said pipe during welding.

ERWIN THIEMER.